United States Patent
Kalhan et al.

(10) Patent No.: US 7,508,791 B2
(45) Date of Patent: Mar. 24, 2009

(54) WIRELESS COMMUNICATION CODING AND TRANSMISSION SYSTEMS AND METHODS

(75) Inventors: Amit Kalhan, La Jolla, CA (US); Doug Dunn, Chula Vista, CA (US); Henry Chang, San Diego, CA (US); Ramon Khalona, Carlsbad, CA (US)

(73) Assignee: Kyocera Corporation, Kyoto (JP)

( * ) Notice: Subject to any disclaimer, the term of this patent is extended or adjusted under 35 U.S.C. 154(b) by 565 days.

(21) Appl. No.: 11/263,893

(22) Filed: Oct. 31, 2005

(65) Prior Publication Data

US 2007/0097980 A1 May 3, 2007

(51) Int. Cl.
*H04L 12/56* (2006.01)

(52) U.S. Cl. .................. 370/329; 370/334; 370/389

(58) Field of Classification Search ........... None
See application file for complete search history.

(56) References Cited

U.S. PATENT DOCUMENTS

| | | | |
|---|---|---|---|
| 5,657,325 A * | 8/1997 | Lou et al. .................. | 370/334 |
| 6,366,561 B1 | 4/2002 | Bender | |
| 6,501,745 B1 | 12/2002 | Turina et al. | |
| 6,608,818 B1 | 8/2003 | Abrol et al. | |
| 6,657,980 B2 | 12/2003 | Holtzman et al. | |
| 6,694,469 B1 | 2/2004 | Jalali et al. | |
| 6,788,687 B2 | 9/2004 | Bao et al. | |
| 6,847,629 B2 | 1/2005 | Razoumov et al. | |
| 2004/0057400 A1 | 3/2004 | Walsh et al. | |
| 2004/0100929 A1 | 5/2004 | Garcia-Luna-Aceves | |
| 2004/0145530 A1 * | 7/2004 | Foore et al. ................ | 343/754 |
| 2005/0094659 A1 * | 5/2005 | Watson ....................... | 370/432 |
| 2005/0138528 A1 | 6/2005 | Ameigeiras et al. | |
| 2005/0157734 A1 | 7/2005 | Li et al. | |
| 2005/0285803 A1 * | 12/2005 | Iacono et al. ............... | 343/702 |
| 2006/0056345 A1 * | 3/2006 | Marinier et al. ............ | 370/329 |

FOREIGN PATENT DOCUMENTS

| | | |
|---|---|---|
| EP | 0735701 | 10/1996 |
| EP | 1096696 | 5/2001 |
| EP | 1 363 422 A1 | 11/2003 |
| EP | 1536 658 A2 | 6/2005 |

OTHER PUBLICATIONS

Guven, Tuna, et al; "Measurement-Based Multicast on Overlay Architecture"; Jul. 6, 2004; University of Maryland; pp. 1-26.*

(Continued)

*Primary Examiner*—Wing F Chan
*Assistant Examiner*—Robert C Scheibel

(57) ABSTRACT

In a wireless communication system, data is encoded by packet indifferent (PI) coding and some packets are transmitted omnidirectionally while supplemental packets are transmitted directionally to a user with a poor air link. PI encoding is defined herein as encoding in which the source data can be recovered from any K of the encoded packets, regardless of which of the encoded packets are received, where K=N+A. N is equal to the number of packets in the source data and A is the number of additional packets required due to the PI encoding. A subset of M data packets can be sent to one or many users from an omnidirectional antenna, where M is greater than or equal to K. If less than K data packets are received by at least one user, then the data block is not successfully received by that user. A number R of supplemental packets can be sent to users that did not receive K data packets successfully. The supplemental packets can be sent by a directional antenna to the specific user or users that did not receive K data packets.

17 Claims, 3 Drawing Sheets

OTHER PUBLICATIONS

Palanki, Ravi, et al; "Rateless Codes on Noisy Channels"; Apr. 2004; Mitsubishi Electric Research Laboratories: TR-2003-124; pp. 1-12.*

Digital Fountain, Tdoc S4-AHP138: "FEC packet archetecture for MBMS streaming", 3GGP SA4-PSM SWG#6, Oct. 11-13, 2004, Newbury, UK.

Ericsson et al., Tdoc S4-AHP159: "FEC Framework for MBMS streaming", TSG-SA WG4 MBMS ad-hoc Meeting #32bis, Oct. 11-13, 2004, Newbury, UK.

International Search Report and Written Opinion (ISR-WO): PCT/ISA/220, 210, 237 for International Application No. PCT/US2006/041224, ISR dated Feb. 14, 2007, 16 pages.

Akyildiz et al., "AdaptNet: An Adaptive Protocol Suite for the Next-Generation Wireless Internet", IEEE Commu. Mag., pp. 128-136, Mar. 2004.

Hamdaoui et al., "A Network-Layer Soft Handoff approach for Mobile Wireless IP-Based Systems", IEEE J. Selected Areas in Commun., vol. 22, No. 4, pp. 630-642, May 2004.

Meyers, Jason (editor), "Telphony's Complete Guide to WIMAX", Telephony, pp. 1-18, May 31, 2004.

Yaghoobi et al., "Scalable OFDMA Physical Layer in IEEE 802.16 WirelessMAN", Intel Tech. J., vol. 8, Issue 3, pp. 201-212, Aug. 20, 2004.

* cited by examiner

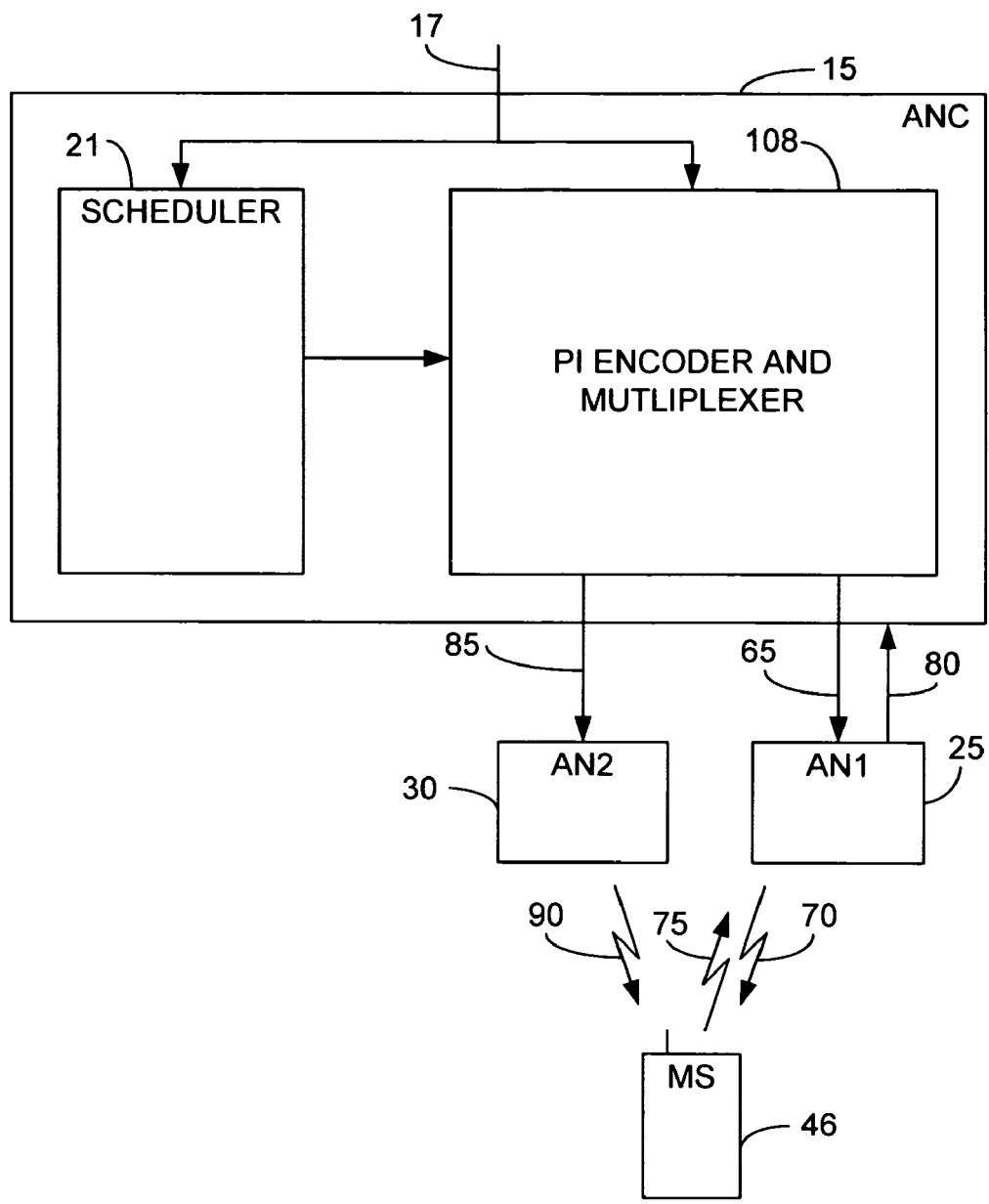

ated by that user. A number R of
WIRELESS COMMUNICATION CODING AND TRANSMISSION SYSTEMS AND METHODS

FIELD OF THE INVENTION

The invention relates generally to wireless communication and more particularly to systems and methods for coding and transmitting wireless communications signals.

BACKGROUND OF THE INVENTION

Consumers are increasingly demanding data services on mobile wireless communication devices, such as cell phones. For example, streaming video is a fun and useful new application for cell phones. One application of streaming video is broadcast video. Broadcast means that data is sent to many users simultaneously. For example, a video movie may be broadcast from a cellular base station to many cell phone users.

One problem with streaming video applications and other similar applications is that they require much more bandwidth than traditional voice calls. The increased bandwidth requirements tend to overload network resources. Additionally, different users have different air link conditions. A user with poor coverage may not successfully receive and decode as much of the data sent as some other users within the same broadcast area.

The user with poor channel conditions may be known in advance or not known in advance.

SUMMARY OF THE INVENTION

In order to overcome the problems associated with conventional approaches for transmitting data in wireless communication networks, the data is encoded by packet indifferent (PI) coding and some packets are transmitted omnidirectionally while supplemental packets are transmitted directionally to a user with a poor air link. PI encoding is defined herein as encoding in which the source data can be recovered from K of the encoded packets, regardless of which of the encoded packets are received, where K=N+A. N is equal to the number of packets in the source data, and A is the minimum number of additional packets required due to the PI encoding. Thus, PI encoding applies to rateless or fountain codes and Reed-Solomon codes, which are described in U.S. patent application Ser. No. 11/125,517, filed on May 9, 2005, which is hereby incorporated by reference.

A subset of M=K+L data packets can be sent to one or many users from an omnidirectional antenna. L is a predicted number of lost packets. If K data packets are received, then the data block is successfully received. If less than K data packets are received by at least one user, then the data block is not successfully received by that user. A number R of supplemental packets can be sent to users that did not receive K data packets successfully. The R supplemental packets can be sent by a directional antenna to the specific user or users that did not receive K data packets.

The sending of supplemental packets by the directional antenna may or may not consume system resources as much as would be consumed if the supplemental packets were sent by the omnidirectional antenna. Thus, even users with poor coverage conditions can receive a sufficient number of packets to reconstruct the original data, and this can be accomplished without burdening the entire set of users.

In the case where the user or location is known in advance, the supplemental data packets may be sent simultaneously with the broadcast packets or later. In the case where the user or location is not known in advance, there are two possibilities. In the first possibility, the system waits until at least one user reports failure of some of the packets (or fails to report success of all of the packets). Then the system initiates sending the supplemental packets to that user or users. In the second possibility, the system uses one or more directional beams sweeping around the cell area sending the supplemental data packets in the same timeframe as the broadcast packets.

More or less supplemental packets can be sent to the user or location with a poor air link depending on how many of the broadcast packets the user with a poor air link was able to receive or was predicted to receive or both.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which:

FIG. 5 is a block diagram illustrating a wireless communication system in which a data block is transmitted omnidirectionally and directionally.

DETAILED DESCRIPTION

Figure 1:
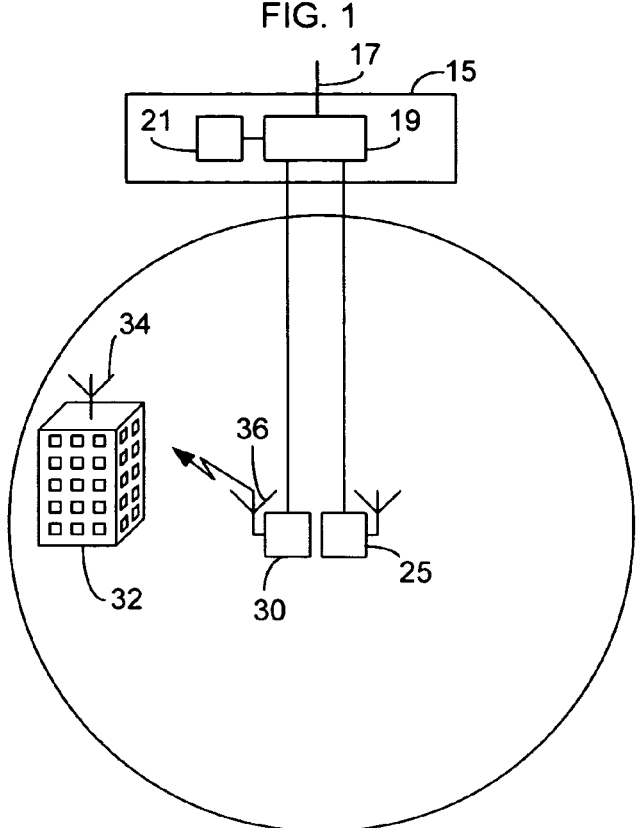
FIG. 1 is a block diagram illustrating a wireless communication system in which a data block is transmitted omnidirectionally and adaptively directionally.

FIG. 1 is a block diagram illustrating a wireless communication system in which a data block is transmitted omnidirectionally and adaptively directionally. Access node controller (ANC) 15 is connected to the internet (not shown) and a private network such as a wireless communication service provider network (not shown) of which ANC 15 may be a part. Data blocks such as video frames are received by ANC 15 at input 17 from the internet and/or the aforementioned private network. For example, a wireless communication service provider may be broadcasting a movie. The movie video frames are received at input 17. As another example, the wireless communication service provider may be broadcasting movie trailers or other video material. As still another example, the data received at input 17 may be video for video teleconferencing.

The data block is received in packet processor and mulitplexer (PPM) 19. PPM 19 may be similar to the PPM described with respect FIG. 5 of the above referenced U.S. patent application Ser. No. 11/125,517. PPM 19 optionally encodes the data block by PI encoding.

ANC 15 is connected to Access Node 1 (AN1) 25 and Access Node 2 (AN2) 30. AN1 25 is any type of omnidirectional wireless access node. For example, AN1 25 may be a base station (access node) compliant with the code division multiple access (CDMA) standards known as TIA/EIA IS-2000 and/or TIA-856 (1×EV-DO) or with GSM, wideband CDMA (W-CDMA), or any other convenient wireless communication system that is capable of omnidirectional transmission. In fact, it may be possible that in the future, communication systems will be configurable from omnidirectional to directional. In that case, AN1 25 would be omnidirectional if AN1 25 was configured at the time to be omnidirectional. Omnidirectional could mean covering all directions within a sector. The coverage areas of cellular base stations are commonly divided into three sectors, each sector including approximately 120 degrees azimuthally from the base station. AN1 25 could actually refer to a base station transmitting in a sector.

AN2 30 is a directional base station. For example, AN2 30 might be a base station with the antenna or antennas configured to transmit a narrow beam in the direction of a certain building 32. AN2 30 might be compliant with the standard known as IEEE 802.16 (also referred to as "WiMAX"). A version of WiMAX is expected to be useful for fixed, line-of-sight communications. Thus, WiMAX may be used to enhance the wireless data throughput to a building, such as building 32.

Regarding omnidirectional transmission, it should be understood that purely uniform transmission power in all directions is the ideal case, but variations from the ideal are within the definition of omnidirectional. Directional is defined herein to mean any directionality other than omnidirectional. A single narrow beam pointing from a transmitter to a receiver is the ideal case of directional transmission, but various beam shapes and multiple beams are considered directional transmissions.

PPM 19 encodes data block by PI encoding. Since data block is encoded by PI encoding it does not matter which of the encoded packets are received as long as at least K packets are received. Further, it does not even matter whether the packets are received from the same transmitter or even over the same network. Advantageously, a receiver, such as a wireless handset, can receive some packets from AN1 25 and some packets from AN2 30 as long as the handset is able to decode/demodulate packets from AN1 25 and AN2 30. The handset can combine the packets received from AN1 25 with the packets received from AN2 30 to reconstruct the source data block. Thus, a handset inside building 32, for example, can receive some packets from a first subset of packets sent over AN1 25 and some packets from a second subset of packets sent over AN2 30. The handset can combine the packets from the first and second subsets to reconstruct the source data block.

For example, a first subset of the PI encoded data packets may be broadcast over AN1 25. The first subset may include enough PI encoded data packets for a user who received all or nearly all of them (e.g., 98% of them) to reconstruct the source data block. For example, AN1 25 may be an IS-2000 compliant access node. Some users might not successfully receive and decode enough of the packets in order to reconstruct the source data block.

For example, a receiver inside building 32 might have poor reception due to attenuation or the multipath environment of the signal in building 32. To Building 32 might be equipped with a WiMAX receiver shown as antenna 34. Thus, packets can be routed through directional antenna 36 connected to AN2 30, which may be a WiMAX base station. Packets can be sent from AN2 30 to WiMAX receiver 34. The packets can be retransmitted inside building 32 by, for example, a wireless local area network (WLAN) (not shown), such as, for example, IEEE 802.11, known as Wi-Fi. Then a particular receiver inside building 32 can receive some packets directly from AN1 25 and some packets from AN2 30 through antenna 34 and retransmission through WLAN (not shown) inside building 32.

Figure 2:
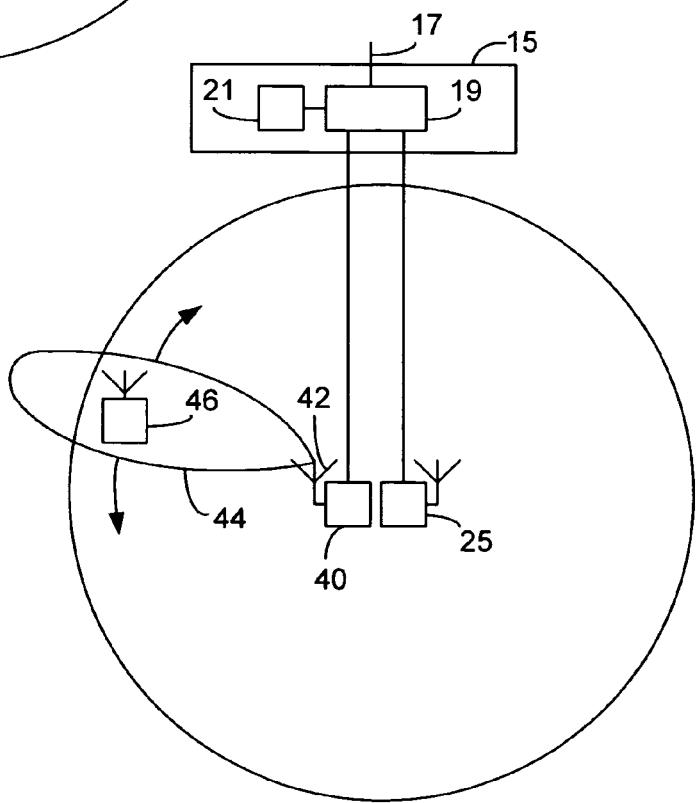
FIG. 2 is a block diagram illustrating a wireless communication system in which a data block is transmitted omnidirectionally and rotatingly directionally.

Alternatively, instead of a fixed directional antenna 36, the supplemental packets can be transmitted by an adaptive directional antenna, as shown with respect to FIG. 2. The system shown with respect to FIG. 2 is similar to the system shown with respect to FIG. 1, except that in FIG. 2, ANC 15 is connected to an adaptive directional AN 3 (AN3) 40. AN3 40 has an adaptive directional antenna or antenna array 42. Adaptive directional antennas are described in U.S. Pat. No. 6,865,377, issued Mar. 8, 2005, U.S. Pat. No. 6,828,923, issued Dec. 7, 2004, and U.S. Pat. No. 6,888,505, issued May 3, 2005, which are incorporated herein by reference.

Adaptive directional antenna array 42 is used to transmit and steer a signal beam 44 to follow a mobile wireless communication device 46, also referred to as mobile station (MS) 46. Advantageously, MS 46 can receive some packets from omnidirectional AN1 25 and some packets from adaptive directional AN3 40. MS 46 can reconstruct source data block from packets received from either AN1 25 or AN3 40.

Figure 3:
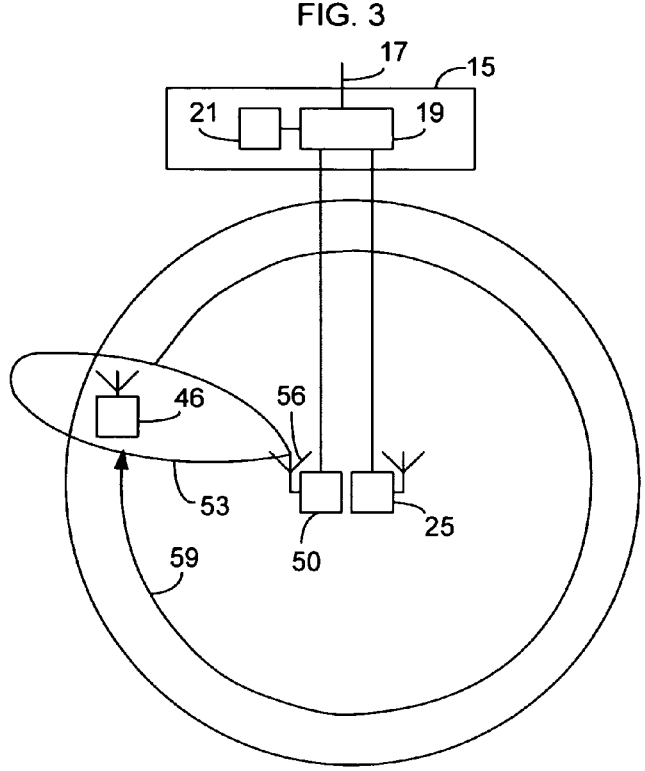
FIG. 3 is a block diagram illustrating a wireless communication system in which a data block is transmitted omnidirectionally and fixedly directionally.

Referring to FIG. 3, in yet another alternative, ANC 15 may be connected to AN 4 (AN4) 50. AN4 50 is used to transmit the supplemental packets in a rotating directional pattern 53. That is, AN4 50 has a directional antenna 56, but instead of transmitting in a known direction of MS 46, AN4 50 transmits the supplemental packets essentially in all directions by rotating beam 53 around AN4 50. In one embodiment, beam 53 is rotated azimuthally around AN4 50, as shown by arrow 59.

FIGS. 1-3 are shown as separate figures, but, in fact, it is possible that the same system could operate in each of the three methods that are illustrated by FIGS. 1-3. That is, AN2 30, AN3 40 and AN4 50 may actually be the same AN. More specifically, a single AN may be used to transmit in a fixed directional manner as shown with respect to FIG. 1, an adaptive directional manner as shown with respect to FIG. 2 and a rotating directional manner as shown with respect to, FIG. 3. AN2 30, AN3 40 and AN4 50 could be collocated with AN1 25.

Figure 4:
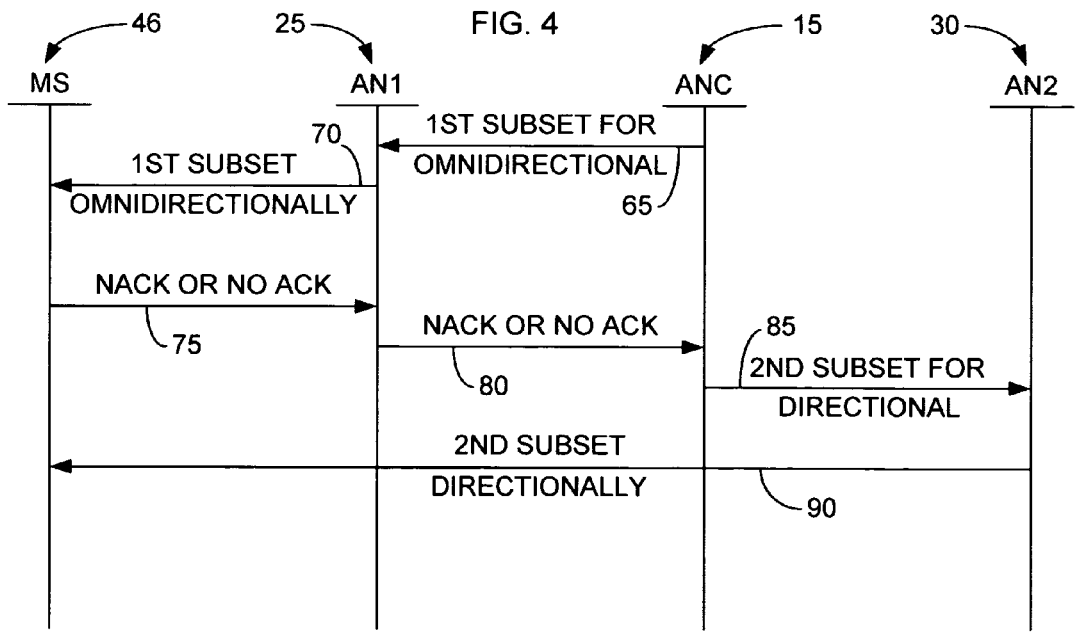
FIG. 4 is a call flow diagram illustrating a wireless communication system call flow in which a data block is transmitted omnidirectionally and directionally.

FIG. 4 is a call flow diagram illustrating a wireless communication system call flow in which a data block is transmitted omnidirectionally and directionally. The call flow diagram is applicable to each of the systems or methods illustrated with respect to FIGS. 1-3. Referring to FIG. 4, four entities are shown: MS 46, AN1 25, ANC 15 and AN2 30. As described above, AN3 40 and AN4 50 are interchangeable with AN2 30 in FIG. 4 (and also in FIG. 5, described below). The call flow starts at signal 65, in which ANC 15 sends a first subset of the PI encoded data packets to AN1 25 for omnidirectional transmission. The omnidirectional transmission could be broadcast or unicast. AN1 25 responds by sending the first subset of the PI encoded data packets to MS 46 omnidirectionally, in communication 70.

If MS 46 successfully received and decoded sufficient packets to reconstruct the source data block, then in signal 75, MS 46 sends an acknowledgement message (ACK), or does not send a Non-acknowledgement message (NACK), depending on whether the communication system is an ACK or NACK system, to AN1 25. In that case, MS 46 does not need to receive any of the second subset of PI encoded packets. Note that signal 75 may actually be the absence of a signal, but the absence of an ACK is interpreted as failure to receive and decode enough packets.

If MS 46 did not successfully receive and decode enough of the packets to reconstruct the source data block, then in signal 75, MS 46 does not send an ACK (or sends a NACK, depending on whether the communication system is an ACK or NACK system) to AN1 25. In that case, MS 46 needs more packets (that is, at least some of the second subset) in order to reconstruct the source data block. Note again that signal 75 may actually be the absence of a signal, but the absence of a NACK is interpreted as success in receiving and decoding sufficient of the packets.

Considering the case where no ACK is sent or a NACK is sent in signal 75, then in signal 80, AN1 25 forwards the NACK or does not send an ACK to ANC 15 in signal 80. At this point, ANC 15 knows that MS 46 was unable to receive and decode sufficient of the PI encoded packets. Responding to this information, ANC 15 sends a second subset of PI encoded packets to AN2 30 for directional transmission to MS 46 in signal 85. In signal 90, AN2 30 transmits the second subset of PI encoded packets to MS 46 in a directional transmission. As referenced above, the directional transmission of signal 90 could be at least in any of the forms illustrated in FIGS. 1-3.

The above discussion refers to communication systems using ACK or NACK messages. However, the ideas described herein could be applicable to a communication system without ACK or NACK messages. Sending supplemental coded packets to known regions with poor coverage without ACK or NAKC would increase the likelihood of successful data block retrieval without making significant change to an existing system without ACK or NACK, such as, for example, broadcast systems. Some broadcast services lack ACK or NACK. This could be a fill for the known coverage hole or to accommodate an area that needs more coverage at a certain time, for example, a stadium such as a ballpark with known heavy usage periods such as game times.

FIG. 5 is a block diagram illustrating a wireless communication system in which a data block is transmitted omnidirectionally and directionally. Specifically, FIG. 5 highlights certain aspects of ANC 15. Source data blocks are received at input 17. An initial decision is made regarding whether the source data is a candidate for transmission both omnidirectionally and directionally. The initial decision is made by scheduler 21 in conjunction with other components or modules not shown, such as, for example, classifier, quality of service module and channel state indicator module. QoS module, classifier and CIS module are shown and described in the previously referenced U.S. patent application Ser. No. 11/125,517, and will not be described here further.

The decision is based on inputs such as whether omnidirectional and directional transmissions sources (e.g., AN1 25 and AN2 30, respectively) are available for transmission to MS 46. If scheduler 21 decides that the source data block should be transmitted only omnidirectionally, then scheduler-21 causes PI encoder and multiplexer 108 to route all coded packets from the source data block to AN1 25. All packets are encoded using PI and transmitted by AN1 25. If, however, scheduler 21 determines that source data block is a candidate for omnidirectional and directional transmission, then scheduler 21 causes PI encoder and multiplexer 108 to route PI encoded packets to both AN1 25 and AN2 30.

Scheduler 21 schedules a number M of PI encoded packets for transmission via AN1 25. Scheduler 21 causes PI encoder and multiplexer 108 to send the first subset of PI encoded packets to AN1 25, as shown by signal 65 (described above with respect to FIG. 4). When ANC 15 receives NACK or no ACK signal 80, signal 80 is sent to scheduler 21. It is noted that in a no-feedback system, signal 80 is not used, and in this case, Scheduler 21 can decide a-priori that some of the packets are sent on AN1 25 and some are sent on AN2 30.

Scheduler 21 responds to signal 80, by determining that a number R of supplemental PI encoded data packets should be sent directionally from AN2 30 to MS 46. Scheduler 21 causes PI encoder and multiplexer 108 to send the R supplemental PI encoded data packets to AN2 30, as shown by signal 85. As stated above, AN2 30 in FIG. 5, may be AN3 40 or AN4 50. AN2 25 transmits the second subset of PI encoded data packets to MS 46, as shown by signal 90.

The number R may be estimated directly from the number of NACK's or ACK's signals received from MS 46. For example, if MS 46 fails to send an ACK signal for six of the M data packets, then the number R may be six, or some number proportional to six. Alternatively, the number R may be estimated based on signal quality indicators received from MS 46. For example, if the communication system used by AN1 25 and MS 46 is an IS-2000 system and MS 46, has indicated to AN1 25 that MS's 46 frame error rate is high, then the number R will be estimated higher to account for MS's 46 high frame error rate. Methods for calculating an appropriate number R of supplemental PI encoded packets based on frame error rate are well known and will not be discussed here further, in the interest of brevity. Advantageously, MS 46 can receive packets from either AN1 25, or AN2 30 and use the packets from either AN to reconstruct the source block of data.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method of transmitting a data block from a wireless communication device, the method comprising:

coding the data block into a number M of coded packets such that the data block can be reconstructed from a number K of the coded packets, where M is greater than or equal to K;

omnidirectionally transmitting the number M of coded packets;

coding the data block into a number R of supplemental coded packets such that the data block can be reconstructed from a combination of a first portion of the number M of coded packets and a second portion of the number R of supplemental coded packets; and directionally transmitting the number R of supplemental coded data packets in more than one direction.

2. The method of claim 1, further comprising:

estimating the number R, the number R comprising the supplemental coded packets necessary for a second wireless communication device to reconstruct the data block.

3. The method of claim 2, wherein the estimating is responsive to an acknowledgement message or a non-acknowledgement message.

4. The method of claim 2, wherein the estimating is responsive to a failure to receive an acknowledgement message or a non-acknowledgement message.

5. The method of claim 1, wherein:

the omnidirectionally transmitting comprises transmitting compliant with a first communication standard; and the directionally transmitting comprises transmitting compliant with a second communication standard.

6. The method of claim 5, wherein the first communication standard comprises a code division multiple access standard.

7. The method of claim 6, wherein the second communication standard comprises the IEEE 802.16 standard (WiMAX).

8. The method of claim 5, wherein the second communication standard comprises the IEEE 802.16 standard (WiMAX).

9. The method of claim 1, wherein the directionally transmitting the number R of the supplemental coded data packets in more than one direction further comprises:
rotating a directional transmission beam azimuthally from a transmission point.

10. A wireless communication system comprising:
a wireless access node controller comprising:
a packet indifferent encoder configured to encode a block of source data into a number M of packet indifferent packets such that a number K of the M packet indifferent packets are sufficient to reconstruct the block of source data, where M is greater than or equal to K; and
a scheduler connected to the packet indifferent encoder;
an omnidirectional wireless access node connected to the scheduler, where the omnidirectional wireless access node is complaint with a first communication standard; and
a directional wireless access node connected to the scheduler, the directional wireless access node is compliant with a second communication standard, wherein the scheduler is configured:
to cause the number M of packet indifferent packets to be sent to the omnidirectional wireless access node; and
to cause a number R of packet indifferent packets to be sent to the directional access node, wherein the data block can be reconstructed from a combination of a first portion of the number M of coded packets and a second portion of the number R of supplemental coded packets.

11. The wireless communication system of claim 10, wherein the first communication standard is a code division multiple access communication standard.

12. The wireless communication system of claim 10, wherein the second communication standard is an orthogonal frequency division multiple access standard, 13. The wireless communication system of claim 10, wherein the second communication standard is IEEE 802.16.

14. The wireless communication system of claim 10, wherein the second communication standard is an orthogonal frequency division multiple access standard.

15. A wireless communication system comprising:
a wireless access node controller means for controlling a wireless access node comprising:
an encoding means for encoding a block of source data into a number M of packet indifferent packets such that a number K of the M packet indifferent packets are sufficient to reconstruct the block of source data, where M is greater than or equal to K; and
a scheduling means connected to the encoding means;
an omnidirectional wireless network accessing means connected to the scheduling means, where the omnidirectional wireless network accessing means is compliant with a first communication standard; and
a directional wireless network accessing means connected to the scheduling means, where the directional wireless network accessing means is compliant with a second communication standard, wherein the scheduling means is configured:
to cause the number M of packet indifferent packets to be sent to the omnidirectional wireless network accessing means; and
to cause a number R of supplemental packet indifferent packets to be sent to the directional wireless network accessing means, wherein the data block can be reconstructed from a combination of a first portion of the number M of coded packets and a second portion of the number R of supplemental coded packets.

16. The wireless communication system of claim 15, wherein the first communication standard is a code division multiple access communication standard.

17. The wireless communication system of claim 15, wherein the second communication standard is an orthogonal frequency division multiple access standard.

* * * * *